United States Patent
Chen et al.

(10) Patent No.: US 12,432,316 B2
(45) Date of Patent: Sep. 30, 2025

(54) CONNECTION METHOD BETWEEN DIFFERENT VIDEO CONFERENCE PLATFORMS AND CONNECTING DEVICE EXECUTING THE METHOD

(71) Applicant: ATEN International Co., Ltd, New Taipei (TW)

(72) Inventors: Tai-Quan Chen, New Taipei (TW); Ko-Cheng Huang, New Taipei (TW)

(73) Assignee: ATEN INTERNATIONAL CO., LTD, New Taipei (TW)

( * ) Notice: Subject to any disclaimer, the term of this patent is extended or adjusted under 35 U.S.C. 154(b) by 379 days.

(21) Appl. No.: 18/173,844

(22) Filed: Feb. 24, 2023

(65) Prior Publication Data

US 2023/0328203 A1   Oct. 12, 2023

(30) Foreign Application Priority Data

Apr. 12, 2022   (TW) .................................. 111113858

(51) Int. Cl.
*H04N 7/14* (2006.01)
*G10L 15/26* (2006.01)
*H04N 7/15* (2006.01)

(52) U.S. Cl.
CPC ............. *H04N 7/147* (2013.01); *G10L 15/26* (2013.01); *H04N 7/15* (2013.01)

(58) Field of Classification Search
CPC ........ G06F 13/4282; G06F 2213/0042; H04N 7/147; H04N 7/15; H04N 7/155; H04N 7/01; H04L 12/1818; H04L 65/1089; H04L 65/4038; H04L 65/403; H04L 65/765; H04L 69/26; G10L 15/26

See application file for complete search history.

(56) References Cited

U.S. PATENT DOCUMENTS

2011/0279634 A1 * 11/2011 Periyannan ............. H04L 51/10
                                                                      348/14.09
2020/0293479 A1 *  9/2020 Tsai ..................... G06F 13/4282

FOREIGN PATENT DOCUMENTS

| CN | 109963109 A |   | 7/2019 |           |
|----|-------------|---|--------|-----------|
| CN | 111541857 A | * | 8/2020 | ............... H04N 7/15 |
| TW | 202034180 A |   | 9/2020 |           |
| TW | 202107887 A | * | 2/2021 |           |

* cited by examiner

*Primary Examiner* — Yogeshkumar Patel
(74) *Attorney, Agent, or Firm* — McClure, Qualey & Rodack, LLP

(57) ABSTRACT

Disclosed is a connection method between different video conference platforms, including the steps of: joining a first video conference by a connecting device via a web browser based on a first conference invitation from a first video conference platform; joining a second video conference by the connecting device via the web browser based on a second conference invitation from a second video conference platform; and broadcasting first video data of the first video conference to the second video conference by the connecting device through a first virtual UVC/UAC device, and broadcasting second video data of the second video conference to the first video conference by the connecting device through a second virtual UVC/UAC device, thereby connecting the first video conference and the second video conference to form a cross-platform video conference.

14 Claims, 5 Drawing Sheets

CONNECTION METHOD BETWEEN DIFFERENT VIDEO CONFERENCE PLATFORMS AND CONNECTING DEVICE EXECUTING THE METHOD

CROSS REFERENCE TO RELATED APPLICATION

This application claims the priority benefit of Taiwan Patent Application Serial Number 111113858, filed on Apr. 12, 2022, the full disclosure of which is incorporated herein by reference.

BACKGROUND

Technical Field

The present disclosure relates to a connection method for network conference system and a connecting device executing the method, and in particular, to a connection method between different video conference platforms and a connecting device executing the method.

Related Art

In order to fulfill the needs of people in different locations joining a meeting at the same time, various video conference platforms (i.e., video conferencing software) that can provide video conferencing functions are constantly being developed. In the design of the existing video conference platforms, people can join the same video conference room for a multi-party session only if they all have the accounts of the video conference platform, or via invitation email sent by the attendee of the video conference room if they do not have accounts corresponding to the video conference platform.

However, some companies and/or countries prohibit the connection of some video conference platforms of employees and/or nationals due to information security concern, so that the video conference platforms available to the employees of different companies and/or nationals of different countries are not all the same. Since different video conference platforms cannot directly communicate with each other, there is a problem that employees of different companies and/or nationals of different countries cannot conduct a multi-party session through video conferencing.

SUMMARY

The present disclosure provides a connection method between different video conference platforms and a connecting device executing the method, which can solve the problem that different video conference platforms cannot communicate with each other mentioned in the Related Art.

In order to solve the above technical problem, the present disclosure is implemented as follows.

In a first aspect, the present disclosure provides a connection method between different video conference platforms, comprising: joining a first video conference by a connecting device via a web browser based on a first conference invitation from a first video conference platform; joining a second video conference by the connecting device via the web browser based on a second conference invitation from a second video conference platform; and broadcasting first video data of the first video conference to the second video conference by the connecting device through a first virtual USB video device class (UVC)/USB audio class (UAC) device, and broadcasting second video data of the second video conference to the first video conference by the connecting device through a second virtual UVC/UAC device, thereby connecting the first video conference and the second video conference to form a cross-platform video conference.

In a second aspect, the present disclosure provides a connecting device, comprising: a processor, a memory and a network communication interface, wherein the memory is electrically connected to the processor and configured to store computer-executable instructions; the network communication interface is electrically connected to the processor; the processor reads the computer-executable instructions, and executes the connection method between different video conference platforms of the present disclosure through the network communication interface.

In the embodiment of the present disclosure, the connecting device joins the video conferences corresponding to conference invitations through the web browser of different video conference platforms, and generates virtual UVC/UAC devices corresponding to the video conferences for broadcasting the video data of each video conference to other video conference(s). Thus, the video conferences of different video conference platforms can exchange video data with each other, thereby solving the problem that different video conference platforms cannot communicate with each other.

DETAILED DESCRIPTION OF THE EMBODIMENTS

The following embodiments describe the features and advantages of the present disclosure in detail, but do not limit the scope of the present disclosure in any point of view. According to the description, claims, and drawings, a person ordinarily skilled in the art can easily understand the technical content of the present disclosure and implement it accordingly.

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as being "directly connected" or "directly coupled" to another element, there is no intervening element therebetween.

In addition, although terms such as "first", and "second" are used herein to describe different elements, the terms are only used to distinguish elements or operations described in the same technical terms.

The term "video conference platform" described in the present disclosure refers to a video conference software, such as Zoom, Skype, Microsoft Teams, WebEx and Google meet, that users can establish or participate in a video conference through a web browser. The difference between the term "video conference" and the term "video conference to be broadcasted" described in the present disclosure is only in the application scenarios in the embodiments. The difference between the term "conference invitation" and the term "broadcasting invitation" described in the present disclosure is only in the application scenarios in the embodiments, and in essence, both of them are used to invite the connecting device to join a video conference.

Figure 1:
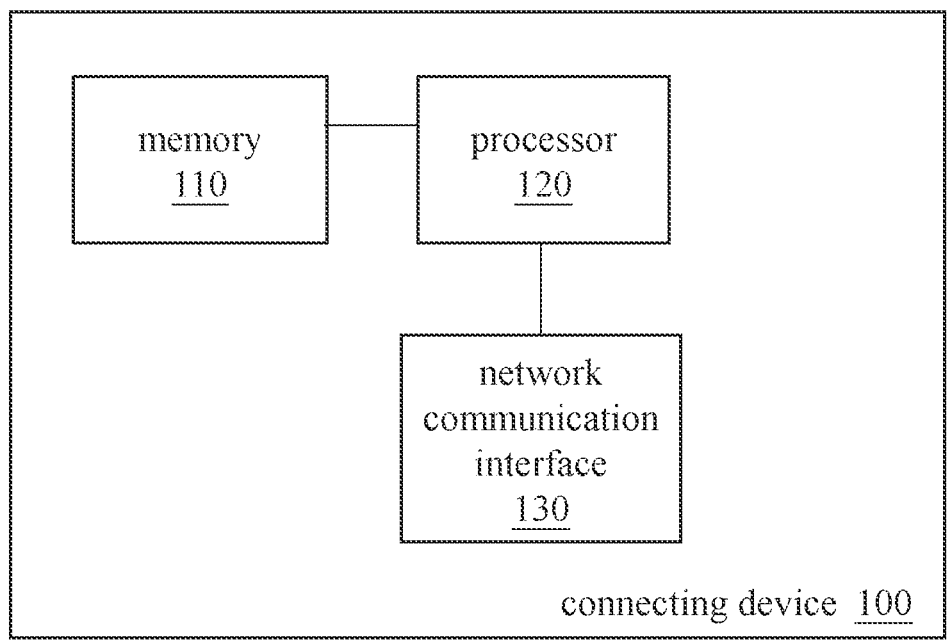
FIG. 1 is a block diagram of an embodiment of a connecting device executing a connection method between different video conference platforms according to the present disclosure.

Please refer to FIG. 1, which is a block diagram of an embodiment of a connecting device executing a connection method between different video conference platforms according to the present disclosure. The connecting device 100 comprises a memory 110, a processor 120, and a network communication interface 130, wherein the memory 110 is electrically connected to the processor 120, and the network communication interface 130 is electrically connected to the processor 120. The network communication interface 130 may comprise a wireless communication interface and/or a wired communication interface. In practical implementation, the connecting device 100 may be, but not limited to, a network connecting device, a computer system or an embedded system.

The memory 110 may be a non-transitory computer-readable medium for storing data, such as read only memory (ROM), flash memory, hard disk, and the like. In this embodiment, the memory 110 stores at least one computer-executable instruction for the processor 120 to execute. In one embodiment, the memory 110 may be used to store temporary data generated during the period that the processor 120 performs operations. In another embodiment, the memory 110 may be used to store data required by the processor 120 to perform operations.

Figure 2:
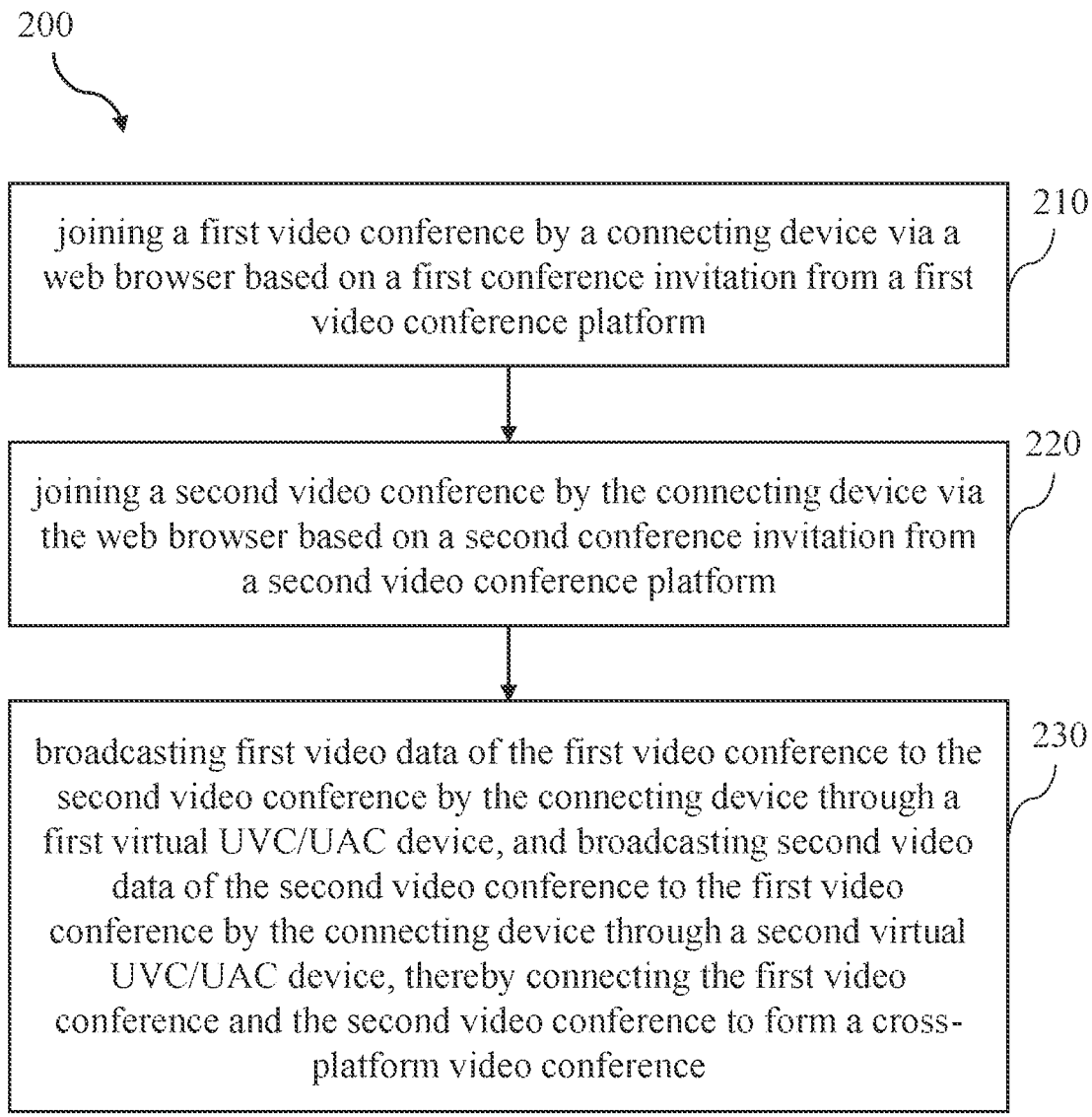
FIG. 2 is a flow chart of a first embodiment of a connection method between different video conference platforms according to the present disclosure.

Please refer to FIG. 1 and FIG. 2, wherein FIG. 2 is a flow chart of a first embodiment of a connection method between different video conference platforms according to the present disclosure. The connection method 200 between different video conference platforms can be executed by the processor 120 of the connecting device 100 shown in FIG. 1 after reading the computer-executable instructions in the memory 110, wherein the connection method 200 for connecting different video conference platforms comprises step 210, step 220 and step 230.

In step 210, the connecting device 100 joins a first video conference via a web browser based on a first conference invitation from a first video conference platform.

In one embodiment, when the memory 110 of the connecting device 100 pre-stores a first user account registered with the first video conference platform, step 210 may comprise: receiving the first conference invitation based on the first user account by the connecting device 100 from any participant of the first video conference; and joining the first video conference via the web browser by the connecting device 100 with the first user account. That is to say, any participant in the first video conference can directly send the first conference invitation to the first user account pre-stored in the connecting device 100, so that the connecting device 100 can join the first video conference of the first video conference platform through the web browser with the first user account. It should be noted that the memory 110 can store one or more user accounts of various video conference platforms, which is not limited herein.

In another embodiment, when the memory 110 of the connecting device 100 does not store the first user account registered with the first video conference platform, step 210 may comprise: receiving the first conference invitation sent by any participant of the first video conference to a pre-stored email account by the connecting device 100, wherein the first conference invitation comprises a conference uniform resource locator (URL) link corresponding to the first video conference; and joining the first video conference via the web browser based on the conference URL link by the connecting device 100. That is to say, although the memory 110 of the connecting device 100 does not store the first user account registered with the first video conference platform, any participant of the first video conference can send the first conference invitation to the email account stored in the memory 110 of the connection device 100 via email, so that the connecting device 100 can join the first video conference through the conference URL link after receiving the first conference invitation.

In step 220, the connecting device 100 joins a second video conference via the web browser based on a second conference invitation from a second video conference platform. The way that the connecting device 100 joins the second video conference based on the second conference invitation is same as the way that the connecting device 100 joins the first video conference based on the first conference invitation, and detailed descriptions thereof is not repeated here.

In step 230, the connecting device 100 broadcasts first video data of the first video conference to the second video conference through a first virtual UVC/UAC device, and broadcasts second video data of the second video conference to the first video conference through a second virtual UVC/UAC device, thereby connects the first video conference room and the second video conference room to form a cross-platform video conference room.

Figure 3:
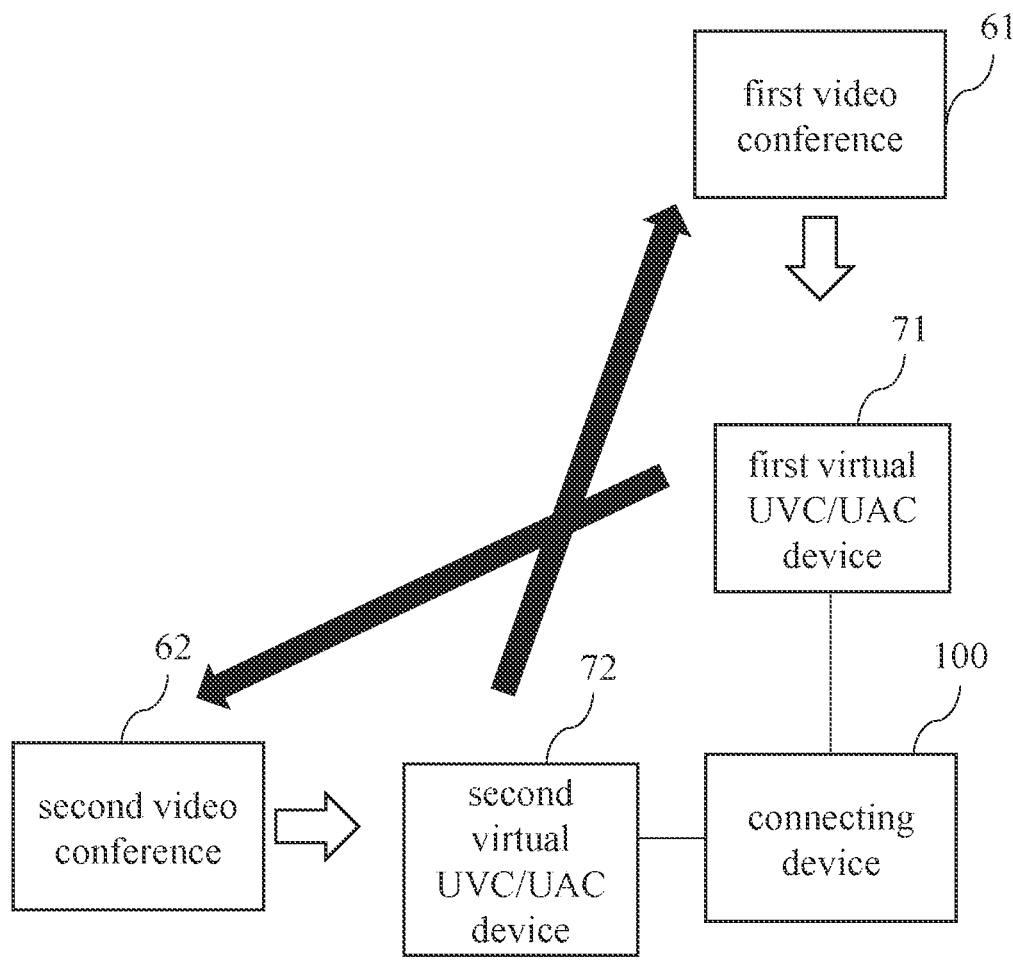
FIG. 3 is a schematic diagram of an embodiment of step 230 in FIG. 2.

Please refer to FIG. 3, which is a schematic diagram of an embodiment of step 230 in FIG. 2. The first video conference 61 can be the video conference held on Google meet, and the second video conference 62 can be the video conference held on Microsoft Teams. The connecting device 100 generates a first virtual UVC/UAC device 71 for the first video conference 61, and broadcasts the first video data of the first video conference 61 (that is, the overall video conference screen and audio data of the first video conference 61) to the second video conference 62 via the first virtual UVC/UAC device 71. The connecting device 100 generates a second virtual UVC/UAC device 72 for the second video conference 62, and broadcasts the second video data of the second video conference 62 (that is, the overall video conference screen and audio data of the second video conference 62) to the first video conference 61 via the second virtual UVC/UAC device 72. Therefore, the first video conference 61 and the second video conference 62 held on different video conference platforms can be connected to form a cross-platform video conference.

After each user joins a video conference, the overall video conference screen of the video conference can display the video image of each user, That is, the video image of any user becomes a partial video conference screen of the overall video conference screen. The overall video conference screen of the first video conference is the first video data, and the overall video conference screen of the second video conference is the second video data. Since the connecting device 100 acts as a virtual participant, when the connecting device 100 broadcasts the first video data of the first video conference 61 to the second video conference 62 via the first virtual UVC/UAC device 71, the first video data becomes the partial video conference screen of the second video conference 62 (that is, the video image corresponding to the second video conference 62 when the connecting device 100 joins the second video conference 62 via the web browser); when the connecting device 100 broadcasts the second video data of the second video conference 62 to the first video conference 61 via the second virtual UVC/UAC device 72, the second video data becomes the partial video conference screen of the first video conference 61 (that is, the video image corresponding to the first video conference 61 when the connecting device 100 joins the first video conference 61 via the web browser).

It should be noted that the above-mentioned connection method 200 between different video conference platforms is described by taking video conferences held on two different video conference platforms being connected as an example. In actual implementation, the connection method 200 between different video conference platforms can be used to make N video conferences of different video conference platform connected, wherein N is a positive integer that greater than or equal to 2. Specifically, the connecting device 100 can join N video conferences via a web browser based on N conference invitations from N different video conference platforms, Then, the connecting device 100 can generate virtual UVC/UAC devices corresponding to the N video conferences, to broadcast the video data of each video conference (that is, the overall video conference screen) to other video conferences through the virtual UVC/UAC devices, so as to connect these N video conferences to form a cross-platform video conference.

In addition, the above-mentioned connection method 200 between different video conference platforms may be applied to the scenario of connecting different video conferences held on the same video conference platform, such as the scenario that the number of expected participants exceeds the maximum allowable number of participants in a single video conference. Specifically, the connecting device 100 can join the first video conference and the second video conference respectively through the web browser based on the first conference invitation and the second conference invitation from the same video conference platform. Then, the connecting device 100 can broadcast the first video data of the first video conference to the second video conference through the first virtual UVC/UAC device, and broadcast the second video data of the second video conference to the first video conference through the second virtual UVC/UAC device, so as to connect the first video conference and the second video conference held on the same video conference platform to form one video conference.

Figure 4:
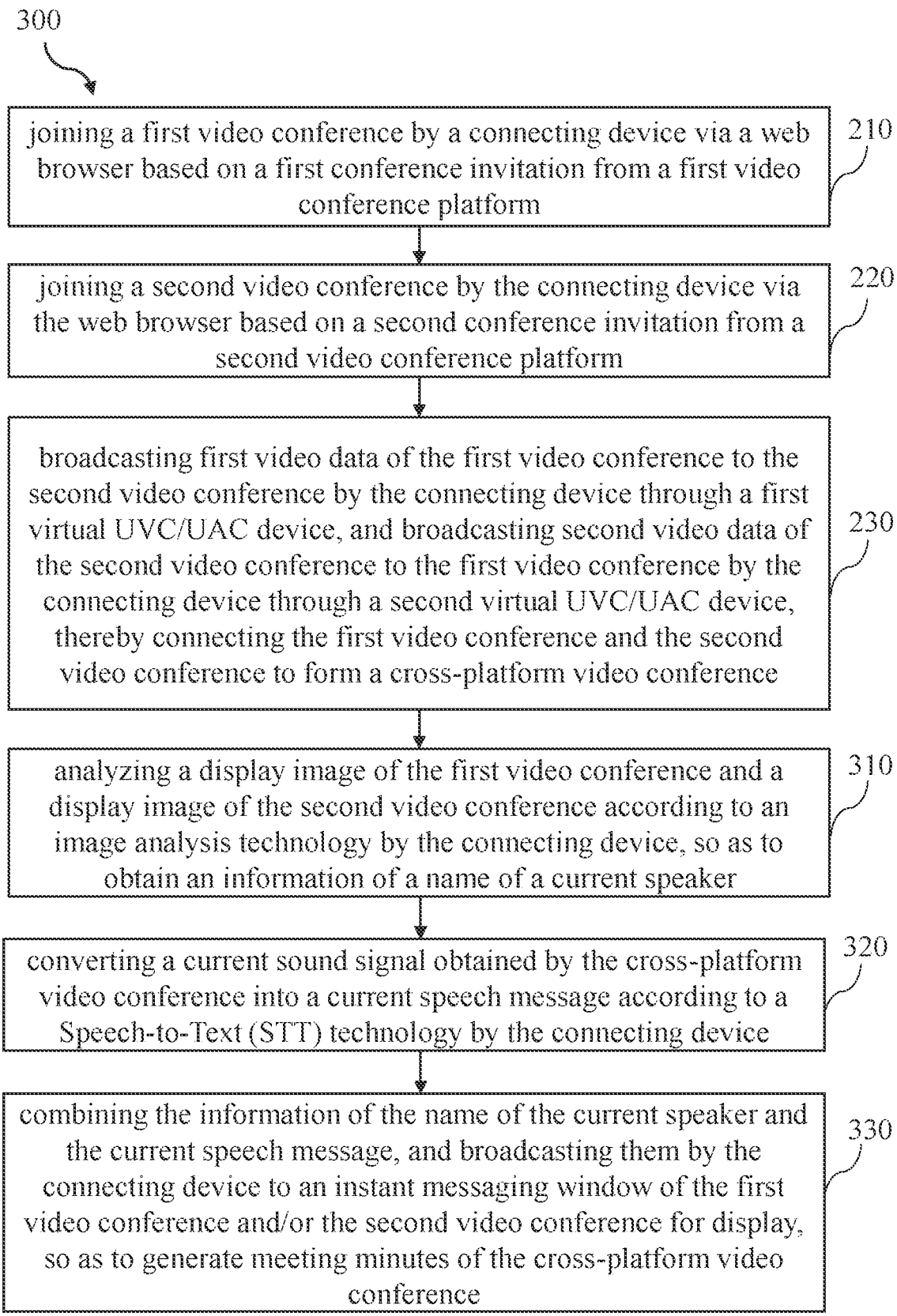
FIG. 4 is a flowchart of a second embodiment of a connection method between different video conference platforms according to the present disclosure.

Please refer to FIG. 1 and FIG. 4, wherein FIG. 4 is a flowchart of a second embodiment of a connection method between different video conference platforms according to the present disclosure. The connecting device 100 can execute the connection method 300 between different video conference platforms through the network communication interface 130 after the processor 120 reads the computer-executable instructions of the memory 110. In addition to step 210 to step 230, the connection method 300 between different video conference platforms may further comprise: analyzing a display image of the first video conference and a display image of the second video conference according to an image analysis technology by the connecting device 100, so as to obtain an information of a name of a current speaker (step 310); converting a current sound signal obtained by the cross-platform video conference into a current speech message according to a Speech-to-Text (STT) technology by the connecting device 100 (step 320); and combining the information of the name of the current speaker and the current speech message, and broadcasting them by the connecting device 100 to an instant messaging window of the first video conference and/or the second video conference for display, so as to generate meeting minutes of the cross-platform video conference (step 330).

In step 310, the connecting device 100 can analyze the display image of the first video conference and the display image of the second video conference according to the image analysis technology, so as to identify a partial video conference screen with the special symbol used to mark the current speaker, such as a highlighted frame or a microphone icon, and further analyze the text in the partial video conference screen with the special symbol according to the optical character recognition (OCR) technology, to obtain the information of the name of the current speaker.

In step 320, the connecting device 100 may perform a voice-to-text process on the voice of the current speaker (i.e., the current voice signal), so as to convert the voice of the current speaker into the current speech message corresponding to the current speaker.

In step 330, the connecting device 100 may combine the information of name of the current speaker and the current speaking message when the time point of obtaining the partial video conference screen marked with the special symbol and the time point of obtaining the current voice signal of the cross-platform video conference are the same, and broadcast the combined result to the instant messaging window of the first video conference and/or the second video conference for displaying (that is, the virtual participant generated by the connecting device 100 leave a text message in the instant messaging window), so that a meeting minutes of the cross-platform video conference is generated.

Figure 5:
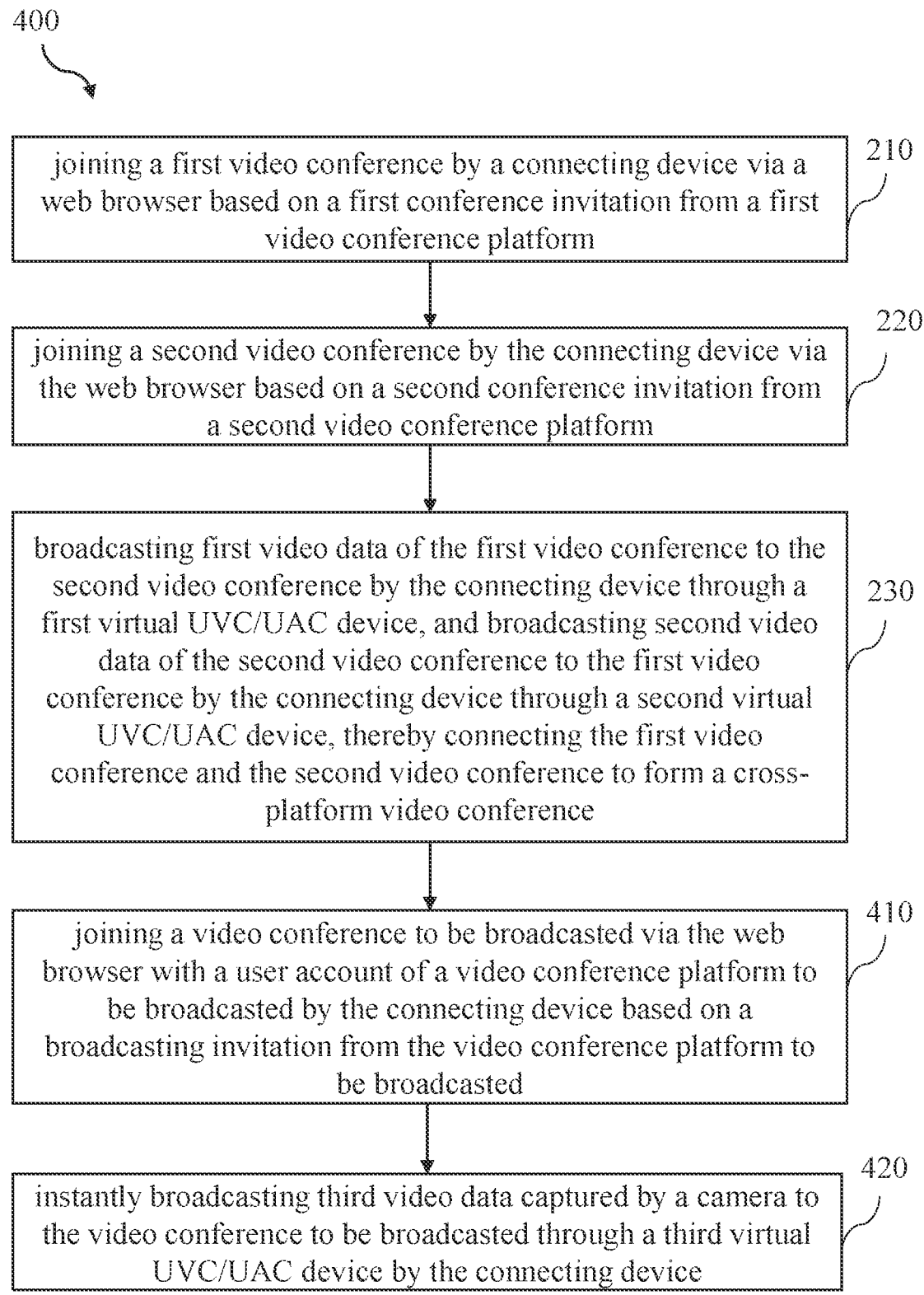
FIG. 5 is a flowchart of a third embodiment of a connection method between different video conference platforms according to the present disclosure.

Please refer to FIG. 1 and FIG. 5, wherein FIG. 5 is a flowchart of a third embodiment of a connection method between different video conference platforms according to the present disclosure. The connecting device 100 can execute the connection method 400 between different video conference platforms through the network communication interface 130 after the processor 120 reads the computer-executable instructions of the memory 110. In addition to step 210 to step 230, the connection method 300 between different video conference platforms may further comprise: joining a video conference to be broadcasted via the web browser with a user account of a video conference platform to be broadcasted by the connecting device 100 based on a broadcasting invitation from the video conference platform to be broadcasted (step 410); and instantly broadcasting third video data captured by a camera to the video conference to be broadcasted through a third virtual UVC/UAC device by the connecting device 100 (step 420).

In step 410, after the connecting device 100 receives the broadcasting invitation of the video conference to be broadcasted, such as the video conference held on Google meet and the video conference held on Microsoft Teams, it can join the video conference to be broadcasted through the web browser based on the conference URL link included in the broadcasting invitation or a user account of the same video conferencing platform with the video conference to be broadcasted. The way that the connecting device 100 joins the video conference to be broadcasted based on the broadcasting invitation may be the same as the way that the connection device 100 joins the first video conference based on the first conference invitation in the above step 210, which is not repeated here.

In step 420, the connecting device 100 can instantly and unidirectionally broadcast the video of local physical conference room (i.e., the connecting device 100 and the camera are located in the same conference space) or the video of remote physical conference room (i.e., the connecting device 100 and the camera are located in the different conference space) to the video conference to be broadcasted via the virtual UVC/UAC device. In one embodiment, step 420 may comprise: obtaining the third video data captured by the camera located in the same conference space through a UVC/UAC protocol by the connecting device 100; and instantly broadcasting the third video data to the video conference to be broadcasted by the connecting device 100 via the third virtual UVC/UAC device. In another embodiment, step 420 may comprise: obtaining the third video data captured by the camera located in different conference spaces through a UVC/UAC protocol by the connecting device 100; and instantly broadcasting the third video data to the video conference to be broadcasted by the connecting device 100 via the third virtual UVC/UAC device.

From the above step 410 and step 420, it can be seen that the connecting device 100 joins the video conference to be broadcasted as a virtual participant, and the overall video conference screen of the video conference to be broadcasted has a conference image of the connecting device 100. Therefore, the connecting device 100 can unidirectionally broadcast the third video data (i.e., the video of the physical conference room) captured by the local/remote connected camera to the conference image of the connecting device 100, so that the participants in the video conference to be broadcasted can watch the video of the physical conference room and interact with the participants in the physical conference room.

It should be noted that the above-mentioned step 410 and step 420 are described with the example of broadcasting the third video data captured by the camera to a single video conference to be broadcasted. In an actual implementation, the third video data captured by the camera can be broadcasted to M video conferences to be broadcasted in step 410 and step 420, wherein M is a positive integer. Part or all of the M video conferences to be broadcasted can be held on the same video conference platform, or the M video conferences to be broadcasted can be held on totally different video conference platforms. When some of the M video conferences to be broadcasted held on the same video conference platform, it means that step 410 and step 420 can be applied when the number of participants who join the video conference to be broadcasted held on a certain video conference platform exceeds the maximum allowable number of participants in a single video conference to be broadcasted of the certain video conference platform.

It should be noted that except for the execution sequence or causal relationship between the steps, the sequence of the steps mentioned in the above-mentioned connection methods 200, 300 and 400 between different video conference platforms may be adjusted according to actual needs, and may even be performed simultaneously or partially simultaneously.

To sum up, in the embodiments of the present disclosure, the connecting device joins the video conferences corresponding to conference invitations through the web browser according to the conference invitations from different video conference platforms, and generates virtual UVC/UAC devices corresponding to the video conferences, to broadcast the video data of each video conference to other video conference(s). Thus, the video conferences of different video conference platforms can exchange video data with each other, and the problem that different video conference platforms cannot communicate with each other in the prior art can be solved.

In addition, the connecting device can use the image analysis technology and the STT technology to record the identity of the current speaker of the cross-platform video conference room and what the current speaker says (that is, the current speech message) in the instant messaging window of at least one video conference connected into the cross-platform video conference, to achieve the technical effect of generating meeting minutes of the cross-platform video conference.

Moreover, the connecting device can join the video conference to be broadcasted through the web browser, and use the virtual UVC/UAC device generated corresponding to the video conference to be broadcasted to broadcast conference video captured by the local or remote camera and received through the UVC/UAC protocol, to achieve the technical effect of instantly and unidirectionally broadcasting the image of local conference room or the image of remote conference room to the video conference to be broadcasted.

Although the present disclosure is disclosed in the foregoing embodiments, it is not intended to limit the present disclosure. Changes and modifications made without departing from the spirit and scope of the present disclosure belong to the scope of the claims of the present disclosure. The scope of protection of the present disclosure should be construed based on the following claims.

What is claimed is:

1. A connection method between different video conference platforms, comprising:
    joining a first video conference by a connecting device via a web browser based on a first conference invitation from a first video conference platform;
    joining a second video conference by the connecting device via the web browser based on a second conference invitation from a second video conference platform; and
    broadcasting first video data of the first video conference to the second video conference by the connecting device through a first virtual USB video device class (UVC)/USB audio class (UAC) device, and broadcasting second video data of the second video conference to the first video conference by the connecting device through a second virtual UVC/UAC device, thereby connecting the first video conference and the second video conference to form a cross-platform video conference.

2. The connection method between different video conference platforms according to claim 1, further comprising:
    receiving the first conference invitation from any participant of the first video conference by the connecting device based on a first user account, which is registered with the first video conference platform and pre-stored in the connecting device; and joining the first video conference via the web browser with the first user account by the connecting device.

3. The connection method between different video conference platforms according to claim 1, further comprising:
receiving the first conference invitation sent by any participant of the first video conference by the connecting device via an email account, which is pre-stored in the connecting device, wherein the first conference invitation comprises a conference uniform resource locator (URL) link corresponding to the first video conference; and
joining the first video conference via the web browser based on the conference URL link by the connecting device.

4. The connection method between different video conference platforms according to claim 1, further comprising:
joining a video conference to be broadcasted via the web browser with a user account of a video conference platform to be broadcasted based on a broadcasting invitation from the video conference platform to be broadcasted by the connecting device; and
instantly broadcasting third video data captured by a camera to the video conference to be broadcasted through a third virtual UVC/UAC device by the connecting device.

5. The connection method between different video conference platforms according to claim 4, further comprising:
obtaining the third video data captured by the camera located in the same conference space through a UVC/UAC protocol by the connecting device; and
instantly broadcasting the third video data to the video conference to be broadcasted via the third virtual UVC/UAC device, by the connecting device.

6. The connection method between different video conference platforms according to claim 4, further comprising:
obtaining the third video data captured by the camera located in different conference spaces through a UVC/UAC protocol by the connecting device; and
instantly broadcasting the third video data to the video conference to be broadcasted via the third virtual UVC/UAC device, by the connecting device.

7. The connection method between different video conference platforms according to claim 1, further comprising:
analyzing a display image of the first video conference and a display image of the second video conference according to an image analysis technology by the connecting device, so as to obtain an information of a name of a current speaker;
converting a current sound signal obtained by the cross-platform video conference into a current speech message according to a speech-to-text technology by the connecting device; and
combining the information of the name of the current speaker and the current speech message, and broadcasting them to an instant messaging window of the first video conference and/or the second video conference for display, by the connecting device, so as to generate meeting minutes of the cross-platform video conference.

8. A connecting device, comprising:
a processor;
a memory, electrically connected to the processor and configured to store computer-executable instructions; and
a network communication interface electrically connected to the processor;
wherein the processor reads the computer-executable instructions, and executes the connection method between different video conference platforms according to claim 1 through the network communication interface.

9. The connecting device according to claim 8, wherein the connecting device receives the first conference invitation from any participant of the first video conference by a first user account, which is registered with the first video conference platform and pre-stored in the connecting device; and joins the first video conference via the web browser with the first user account.

10. The connecting device according to claim 8, wherein the connecting device receives the first conference invitation sent by any participant of the first video conference via an email account, which is pre-stored in the connecting device; and joins the first video conference via the web browser based on a conference URL link included in the first conference invitation.

11. The connecting device according to claim 8, wherein the connecting device joins a video conference to be broadcasted via the web browser with a user account of a video conference platform to be broadcasted based on a broadcasting invitation from the video conference platform to be broadcasted; and instantly broadcasting third video data captured by a camera to the video conference to be broadcasted through a third virtual UVC/UAC device.

12. The connecting device according to claim 11, wherein the connecting device obtains the third video data captured by the camera located in the same conference space through a UVC/UAC protocol; and instantly broadcasts the third video data to the video conference to be broadcasted via the third virtual UVC/UAC device.

13. The connecting device according to claim 11, wherein the connecting device obtains the third video data captured by the camera located in different conference spaces through a UVC/UAC protocol; and instantly broadcasts the third video data to the video conference to be broadcasted via the third virtual UVC/UAC device.

14. The connecting device according to claim 8, wherein the connecting device analyzes a display image of the first video conference and a display image of the second video conference according to an image analysis technology, to obtain an information of a name of a current speaker; converts a current sound signal obtained by the cross-platform video conference into a current speech message according to a speech to text technology; and combines the information of the name of the current speaker and the current speech message, and pushes them to an instant messaging window of the first video conference and/or the second video conference for display, to generate meeting minutes of the cross-platform video conference.

* * * * *